United States Patent [19]

Mukai et al.

[11] 4,063,828

[45] Dec. 20, 1977

[54] PLASTIC PENCILS

[75] Inventors: Atsuhiko Mukai; Yoshio Mori, both of Sagamihara, Japan

[73] Assignee: Teijin Limited, Osaka, Japan

[21] Appl. No.: 613,357

[22] Filed: Sept. 16, 1975

Related U.S. Application Data

[63] Continuation-in-part of Ser. No. 507,287, Sept. 19, 1974, abandoned, which is a continuation-in-part of Ser. No. 219,869, Jan. 21, 1972, abandoned.

[30] Foreign Application Priority Data

Jan. 26, 1971 Japan .................................. 46-2522
Jan. 28, 1971 Japan .................................. 46-2947

[51] Int. Cl.$^2$ ...................... B43K 19/02; C08L 23/06
[52] U.S. Cl. ................................ 401/96; 260/2.5 HA; 260/2.5 HB; 260/42.18; 260/897 A; 264/176 R; 264/129; 428/500; 428/516
[58] Field of Search .................... 401/96; 260/2.5 HB, 260/2.5 HA; 264/45.4

[56] References Cited

U.S. PATENT DOCUMENTS

| 3,474,048 | 10/1969 | Chappelear et al. | .......... 260/2.5 HB |
| 3,520,834 | 7/1970 | Mizutani et al. | .............. 260/2.5 HA |
| 3,551,064 | 12/1970 | Bartner | .................................. 401/96 |

*Primary Examiner*—Wilbert J. Briggs, Sr.
*Attorney, Agent, or Firm*—Sherman & Shalloway

[57] ABSTRACT

Plastic pencils comprising a writing core, a porous casing to enclose said writing core, and a coating which is coated on the surface of said porous casing, said casing being a homogeneous unitary mixture composed of 100 parts by weight of atactic polystyrene, 10–40 parts by weight of polyethylene, 10–55 parts by weight of glass fibers and the required amount of coloring agent and having sharperability comparable to that of incense cedar and a flexural modulus in excess of 30,000 kg/cm$^2$, and said coating being a homogeneous unitary mixture composed of 100 parts by weight of atactic polystyrene, 5–50 parts by weight of polyolefin and a required amount of a coloring agent.

3 Claims, No Drawings

PLASTIC PENCILS

The present application is a continuation-in-part application of U.S. Ser. No. 507,287 filed Sept, 19, 1974 which in turn is a continuation of United States Application Ser. No. 219,869 filed Jan. 21, 1972, both now abandoned.

The present invention is concerned with plastic pencils, and more particularly with plastic pencils characterized by a porous plastic casing having necessary and sufficient sharpenability and rigidity as well as by a colored plastic coating having improved sharpenability and appearance.

Recently, several brands of new products have been commercialized to substitute for conventional pencils, and are referred to as plastic pencils. Plastic pencils are manufactured, for example, by extruding the melt of a thermoplastic resin, which serves as the casing material, around the writing core containing a plastic binder which is also being extruded, in the manner similar to coating electric wires, and painting the surfaces of so formed product by the method conventionally employed for painting pencils. With the earlier plastic pencils provided so far, however, the casing lacked practicable sharpenability and rigidity, the coating exhibited poor adhesiveness to the casing thereby giving poor appearance, and the coating posed adverse effects to the sharpenability of the casing. Therefore, improvements of such deficiencies were greatly demanded.

According to the present invention, to meet such requirements, there are provided plastic pencils comprising a writing core, a porous casing to enclose said writing core, and a coating which is coated on the surface of said porous casing, said casing being a homogeneous unitary mixture composed of 100 parts by weight of atactic polystyrene, 10–40 parts by weight of polyethylene, 10–55 parts by weight of glass fibers and a required amount of a coloring agent and having sharpenability comparable to that of incense cedar and a flexural modulus in excess of 30,000 kg/cm$^2$, and said coating being a homogeneous unitary mixture composed of 100 parts by weight of atactic polystyrene, 5–50 parts by weight of polyolefin and a required amount of a coloring agent. The plastic pencils according to the present invention can be made by continuously extruding the writing core containing a plastic binder, and, around the writing core which is being extruded, continuously extruding the melt of a casing material composed of 100 parts by weight of atactic polystyrene, 10–40 parts by weight of polyethylene, 10–55 parts by weight of glass fibers and a required amount of a coloring agent to form the casing, and further extruding the melt of a coating composition composed of 100 parts by weight of polystyrene, 5–50 parts by weight of polyolefin, and a required amount of a coloring agent, around the casing which contains the writing core while the casing is still in the plasticized state, to form a thin coating on the surface of said casing. According to the above-mentioned process, the fixing of casing on the writing core and coating of the casing are performed using a single die through a single step, making it possible to manufacture the plastic pencils of the present invention very efficiently.

In the foregoing, the "writing core containing a plastic binder" signifies the writing core formed from the powdery coloring agent such as graphite, organic pigment, and the like, which is bound with thermoplastic resin. Such a writing core is normally made by extruding, through one or more orifices of the required size, for example 2 mm in diameter, the melt of a homogeneous mixture of the thermoplastic resin, the powdery coloring agent, and if necessary, a hardness adjuster such as a metal soap. As the useful thermoplastic resin, an uncured epoxy resin of 2,2-bis-(4'-hydroxyphenyl)-propane/epichlorophydrine type which is solid at room temperature, mixtures of said epoxy resin with acrylonitrile/styrene copolymers or with ethyl cellulose, mixtures of acrylonitrile/styrene copolymers with high pressure polyethylene, mixtures of polystyrene with high pressure polyethylene, polyvinyl chloride, styrene/butadiene copolymer, acrylonitrile/styrene/butadiene copolymer, and the like are known of the named thermoplastic resins. The first-mentioned epoxy resins, particularly those having the molecular weights of 700–15,000, are the most preferred for use in the present invention.

The present invention employs a casing material which, as mentioned earlier, consists of 100 parts by weight of atactic polystyrene, 10–40 parts by weight of polyethylene, 10–55 parts by weight of glass fibers, 0.2–0.8% of a blowing agent based on the total weight of the aforementioned three components, and a required amount of a coloring agent.

The atactic polystyrene contained in the casing material may be any of GP polystyrene which is a transparent homopolymer of styrene, HI polystyrene modified with butadiene rubber or styrene butadiene rubber for improving impact strength, or a copolymer of styrene with a small amount of other monomer. Usually, GP polystyrene with a molecular weight of 90,000 to 350,000 are most suitable. The polyethylene contained in the casing material may be of low, medium, and high densities. In respect of sharpenability, low density polystyrenes give the best results. The melt index of the low density polyethylene should better be higher for attaining good sharpenability, but such polyethylene decreases flexural modulus of the casing. Hence, the melt index should be selected within a range of about 0.3 to 20 g/10 minutes.

The glass fibers that are contained in the casing material are not particularly limited, but preferred are those of chopped strand type in which the diameter of the single filament is 5–15 microns, and the cut length is 1–10 mm. Those glass fibers whose surfaces have been treated with a silane-type compound are naturally desirable.

If the amount of polyethylene per 100 parts by weight of polystyrene is less than 10 parts by weight, the sharpenability of the resulting casing is extremely reduced, and the casing cannot withstand use in practical applications. Amounts in excess of 40 parts by weight improve the sharpenability of the resulting pencil casing, but result in a drastic decrease in flexural properties, especially flexural strength. In addition, a raw batch containing such an excessive amount of polyethylene is difficult to fabricate into a pencil casing.

If the amount of glass fibers is less than 10 parts by weight, it is impossible to obtain a pencil casing having a desirable flexural modulus. If the amount of glass fibers is as high as above 55 parts by weight, it becomes abruptly difficult to fabricate the raw batch into a pencil casing, but in spite of this the flexural properties of the casing are not improved.

Examples of suitable chamical blowing agents that can be contained in the casing material include azodicarbonamide, p.p'-oxybis(benzenesulfonyl hydrazide), dinitrosopentamethylene tetramine, or -toluene sulfonyl semicarbazide. Usually, the use of azodicarbonamide is preferred. When such a blowing agent is used, it is customary to use various compounds such as zinc or cadmium compounds conjointly in order to control the decomposition temperature of the blowing agent. The amount of the blowing agent that proves suitable is about 0.2 to 0.8% based on the total weight (weight of pellets) of polystyrene, polyethylene and glass fibers.

As a coloring agent to be contained in the casing material, there may be used any dyestuff or pigment in an appropriate amount so that a hue resembling, for example, incense cedar is imparted to the casing.

Special natural woods, such as incense cedar occurring in America have been used as a material for pencil casing. Incense cedar has proved superior both in rigidity and sharpenability as a material for production of pencil casings. Such natural woods, however, are susceptible to ambient temperatures and humidites, and often result in the warping or bending of the finished pencil casing. Furthermore, in recent years, the cost of production of pencils has been rapidly increasing because of an increased cost of slats for pencil casing.

Attempts have therefore been made to replace pencil casings by plastics, but have not been successful to date. Plastic materials so far tested have not proved satisfactory in both of the rigidity and sharpenability mentioned above.

Extensive work by the inventors of the present invention shows that a pencil casing should desirably have sharpenability comparable to that of incense cedar, but need not have rigidity equal to that of incense cedar. The rigidity which incense cedar possesses is too excessive for use in pencil casings. If the rigidity of incense cedar is expressed by a flexural modulus, it is as high as 60000–80000 Kg/cm$^2$ measured in the form of casing. However, pencil casing materials do not require such a high rigidity for practical use. Rigidity in excess of 30000 Kg/cm$^2$ is satisfactory for practical purposes. Accordingly, if a plastic material having an excellent sharpenability comparable to that of incense cedar and a flexural modulus in excess of 30000 Kg/cm$^2$ is developed, it can replace the conventional casing materials.

The aforementioned pencil casing material composed of 100 parts by weight of atactic polystyrene, 10–40 parts by weight of polyethylene, 10–55 parts by weight of glass fiber, 0.2–0.8% to the total of the foregoing three components of a chemical blowing agent and the required amount of a coloring agent makes it possible to produce a pencil casing that has the above-mentioned sharpenability as well as rigidity.

In a preferred embodiment of the present invention, the writing core of endless length is formed by melt-extruding a homogeneous mixture of the aforesaid writing core materials through circular orifices, and the core is caused to pass through a cross-head die. Simultaneously therewith, the melt of the aforesaid casing material is extruded around the writing core which is passing through the crosshead-die, thereby continuously forming in the die the casing containing as its axis the writing core. Subsequently the melt of a coating composition composed of 100 parts by weight of atactic polystyrene, 5–50 parts by weight of polyolefin, and the required amount of a coloring agent, is extruded into the crosshead-die, to continuously form a thin coating of said melt around the as-formed casing passing through the crosshead-die which is still in the plasticized state. Then the product is withdrawn from the die, which is further formed if necessary.

The "atactic polystyrene" to be employed in the coating composition includes, besides styrene homopolymers, copolymers of styrene with minor ratios of $\alpha\lambda$ methylstyrene, rubber-modified polystyrene normally referred to as high impact polystyrene, and the like. Also, the examples of polyolefins may be medium-pressure or low-pressure polyethylenes, polypropylenes (Melt Index 0.5 10.0 g/10 min (measured at 230° C)), ethylene-propylene copolymers, etc. with favorable results. When the quantitative ratio of polyolefin to polystyrene is increased in the coating composition, the product shows improved sharpenability, but tends to have an impaired appearance as to, for example, surface luster and regularity of hexagonal cross-section, if such is selected, because the composition fails to give satisfactory coating to the casing. Whereas, if the quantitative ratio of polyolefin to polystyrene is relatively reduced, the pencil shows the finish of improved appearance, but its sharpenability tends to be impaired. Normally satisfactory results are obtained when the amount of polyolefin ranges from 5–50 parts by weight per 100 parts by weight of polystyrene.

The melt of the above coating composition that can be used may be a melt of a pelletized blend polymer prepared in a customary manner from a mixture of polystyrene pellets and polyolefin pellets in the desired proportions. However, in the present invention, the use of a fresh melt directly prepared from a mixture of polystyrene pellets and polyolefin pellets in the desired proportions is recommended rather than the melt obtained by the conventional method. This is because the melt prepared by the latter method can give the coating of favorable sharpenability, even when the quantitative ratio of polyolefin to polystyrene is relatively low, for example, 5–20 parts by weight per 100 parts by weight of polystyrene. This is indeed a surprising phenomenon, because the accepted general tendency is that the reduced amount of polyolefin relative to polystyrene in the coating composition results in an improved appearance but impaired sharpenability of the product. The reason why such a difference is caused by the manner of making the melt is not yet clear. One possible reason may be that in the latter method the degree of plasticizing and milling of the polymer or of the thermal history is less compared with the conventional practice.

The coating composition may further contain, in addition to polystyrene, polyolefin and the coloring agent, various additives of the type customarily used with thermoplastic resin, such as filler, stabilizer, lubricant, antistatic agent, and the like, each of the suitable amount.

The thickness of the coating may be approximately of the same order as that of ordinary pencils, which is from about 0.1 to 0.3 mm.

According to the invention, the pencils in which the coating exhibits excellent compatibility or adherability with the casing can be obtained, because the casing is made of styrene-type resin or foamed product thereof, and the coating composition is made predominantly of polystyrene. Furthermore, the pencils can be prepared through single step using a crosshead-die of simple structure as aforesaid, and the product shows excellent appearance and machinability.

In the present specification, evaluation of sharpenability is determined by measuring a value of resistance generated in an electric pencil sharpener when the pencil is sharpened by use of the sharpener, to wit, a difference between a maximum input of a motor at the time of sharpening the pencil and a maximum input thereof when the sharpener is not used for sharpening the pencil.

Hereinafter the invention will be more specifically explained with reference to non-limitative Examples.

EXAMPLE 1

A plastic pencil was prepared, using a pencilmanufacturing apparatus comprising a 40 mm extruder for casing material (extruder A), 30 mm extruder for writing core material (extruder B), 25 mm extruder for coating material (extruder C), and pencil-molding cross-head die formed by modifying a part of a conventional electric wire-coating cross-head die. In the apparatus, the extruder A was connected on the die at right angles to the pencil-molding direction, the extruder B was connected along the pencil-molding direction but on the opposite side from the exit of the die, and the extruder C was connected in the vicinity of the die exit, paralleling with the extruder A.

The casing material was prepared as follows:

A mechanical mixture of 100 parts of polystyrene pellets (Styron 666, styrene homopolymer of Asahi Dow Company), 25 parts of polyethylene pellets (high pressure, melt index 7.0 g/10 minutes), and 53 parts of glass fibers (treated with aminosilane, chopped strand in which the individual fibers have a diameter of 13 microns and a cut length of 6 mm) was put continuously into a hopper of a 68 mm extruder equipped with a Dulmage-type screw, and extruded into the form of strand at about 220° C. After cooling with water, the extruded product was cut into the form of pellets with a diameter of about 3.0 mm and a length of 4.0–5.0 mm. One hundred parts of the pellets and 0.8 part of polyethylene glycol having a molecular weight of 400 were tumbled for 15 minutes, and then 0.5 part of azodicarbonamide, 0.35 part of zinc oxide powders, 0.35 parts of talc powders, and 0.03 part of a pigment were added at a time. The tumbling was performed for additional 15 minutes.

The writing core material was prepared as follows:

1200g of an epoxy resin (Epikote 1010 manufactured by Shell International Chemicals Corporation; molecular weight-about 5000; melting point-155°–165° C.) which had been ground to pass through a 20-mesh sieve, 7000 g. of natural crystalline graphite (average particle size = 6 $\mu$) and 1800 g. of calcium stearate were well mixed in a tumbler and the mixture was dried at 85° C. for 5 hours. Then, the mixture was fed to an extruder at the front end point of which a die having holes of a diameter of 3.0 mm. was mounted, and the melt-extrusion was conducted at a cylinder temperature of 130° C. (at the rear) – 140° C. (at the front) and at a die temperature of 130° C. The extruded strands were hot-cut into pellets having a length of 4–6 mm.

The melt of the above-specified casing material was extruded from the extruder A which was heated to 160′175° C.; the melt of the writing core material was extruded from the extruder B which was heated to 140° – 150° C.; and the melt of the coating material consisting of 100 wt. parts of polystyrene pellets (Styron 666), 7 wt. parts of polyethylene pellets (low-pressure polyethylene, melt index = 1.0g/10 minutes), and 0.4 wt. part of a green organic pigment, through the extruder C which was heated to 220° – 250° C.; all continuously into a die which was heated to 170° C. The extrudate from the die was continuously molded by a forming die into a dimension of ordinary pencil (hexagonal cross section with a length of one side being about 3.8 mm), cooled in a water cooling bath, and cut into the regular pencil length of 175 mm. Thus a pencil in accordance with the present invention was obtained.

The product pencil had the structure in which the porous casing composed of a polystyrene, polyethylene and glass fibers was uniformly fixed around the 2-mm diameter writing core containing a plastic binder located at the center, and the casing was coated with the 0.2-mm thick, green coating composition composed of polystyrene and polyethylene.

One such pencil weighed about 7.3 g, which is heavier than a pencil made of an incense cedar material (about 4.0 g). This difference in weight does not pose a problem in practical use. Furthermore, even when letters were written with this pencil, the casing was neither bended nor warped. The casing was found to have a flexural modulus of about 40000 Kg/cm$^2$ and an apparent density of about 0.87 g/cm$^3$.

Because the polyethylene content in the coating composition employed was low, the pencil could be very easily formed by the forming die, and had the beautiful appearance as to the surface luster and regularity of the hexagonal cross section. Furthermore, notwithstanding the low polyethylene content in the coating composition, the pencil could be readily sharpended as in the conventional pencils by any of electric sharpeners and knives. The sharpening resistance value was 0.40–0.60 watt (that of the incense cedar being about 0.40 – 0.60 watt). When a pencil of about 500 m length (corresponding to about 3000 pencils) was continuously sharpended, there was no trouble caused in the sharpener.

EXAMPLE 2

A pencil was prepared quite in the same manner as in Example 1 above, with the exception of using a coating material composed of 100 parts by weight of polystyrene pellets (Styron 666), 15 parts by weight of polypropylene pellets (Noblen, melt index 7.0 g/ 10 min), and 0.4 part by weight of a green color-producing pigment.

The so prepared pencil showed sharpenability, appearance of coating and flexural modulus of the casing that are almost all of the same level as those of the pencil prepared in Example 1.

EXAMPLE 3

A plastic pencil was manufactured with the apparatus and through the procedures similar to those of Example 1, except that the extruder C was heated to 210° – 220° C., and the coating material fed thereinto were pellets formed by melt-extruding and chopping the extrudate of the mixture of 100 wt. parts of polystyrene pellets (Styron 666), 20 wt. parts of polyethylene pellets (low-pressure polyethylene melt index = 1.0g/10 minutes), 0.3 wt. part of an yellow organic pigment, and 1 wt. part of an antistatic agent.

The so obtained pencil showed sharpenability, appearance of coating and the flexural modulus of the casing that are nearly of the same level as those of the pencil of Example 1. By way of control, the foregoing procedures were repeated except that the polyethylene pellets content in the blend polymer was reduced from 15 wt. parts to 3 wt. parts. The resulting product showed somewhat greater resistance when sharpened with electric-powered pencil sharpeners.

EXAMPLE 4

The procedure of Example 1 was repeated except that as the casing material low density polyethylene having a melt index of 20 g/10 minutes was used instead of the high pressure polyethylene having a melt index of 7.0 g/10 minutes. The resulting pencil had good sharpenability, and a sharpening resistance value of 0.35 to 0.55 watt. The coated casing of this pencil had an apparent density of 0.86 g/cm$^3$, and a flexural modulus of 38000 Kg/cm$^2$.

EXAMPLE 5

The procedure of Example 1 was repeated except that as the casing material high impact polystyrene (Styron 475, product of Asahi Dow Company) was used instead of Styron 666. The resulting pencil had the same sharpenability as that of a pencil produced using an incense cedar material, and a sharpening resistance value of 0.40–0.55 watt. The coated casing of the pencil had a flexural modulus of 33000 Kg/cm$^2$ and an apparent density of 0.90 g/cm$^3$.

EXAMPLE 6

The procedure of Example 2 was repeated except that as the casing material high density polyethylene having a melt index of 6.0 g/10 minutes was used instead of the high pressure polyethylene having a melt index of 7.0 g/10 minutes. The resulting pencil and a sharpening resistance of 0.50–0.70 watt, and its coated casing had an apparent density of about 0.92 g/cm$^2$ and a flexural modulus of 50000 Kg/cm$^2$.

EXAMPLE 7

A pencil was produced in substantially the same way as set forth in Example 1 except that as the casing material a raw batch consisting of 100 parts of polystyrene (same as in Example 1), 25 parts of polyethylene (same as in Example 1) and 11 parts of glass fibers (same as in Example 1) was used. The temperature of the 40 mm extruder was slightly raised or lowered, and the degree of foaming was changed to produce pencil casings having different apparent densities. Investigation of the relation between the apparent density and the flexural modulus indicated that the flexural modulus of above 30000 Kg/cm$^2$ cannot be insured unless the apparent density is above about 0.90 g/cm$^3$. It can therefore be seen that if the amount of glass fibers is reduced beyond that specified above, the coated casing has a flexural modulus of less than 30000 Kg/cm$^2$. When the apparent density of the coated casing was 0.90 g/cm$^3$, its cut resistance value was 0.35–0.55 watt.

EXAMPLE 8

A pencil with a casing having an apparent density of 0.85 g/cm$^3$ was produced in substantially the same way as set forth in Example 1 except that as the casing material a raw batch (A) consisting of 100 parts of polystyrene (same as in Example 1), 11 parts of polyethylene (same as in Example 1), and 50 parts of glass fibers, and a raw batch (B) consisting of 100 parts of polystyrene (same as above), 39 parts of polyethylene (same as above), and 55 parts of glass fibers (same as above) were used. The flexural modulus of the coated casing was 45000 Kg/cm$^2$ for (A), and 30000 Kg/cm$^2$ for (B). It is seen from this that in order to produce pencils that can be used for practical purposes, the amount of polyethylene cannot be increased beyond that contained in the raw batch (B) illustrated above.

The pencil from raw batch (A) had a sharpening resistance of 0.50–0.75 watt which is just a little bit higher than that of a pencil from an incense cedar material, but proved easy to sharpen in actual use. The pencil from raw batch (B) was easier to sharpen that a pencil from an incense cedar material, and had a sharpening resistance of 0.30–0.45 watt.

What is claimed is:

1. A plastic pencil comprising a writing core, a porous casing to enclose said writing core, and a coating which is coated on the surface of said porous casing, said casing being a homogeneous unitary mixture composed of 100 parts by weight of atactic polystyrene, 10–40 parts by weight of polyethylene, 10–55 parts by weight of glass fibers and the required amount of a coloring agent and having sharpenability comparable to that of incense cedar and a flexural modulus in excess of 30,000 kg/cm$^2$, and said coating being a homogeneous unitary mixture composed of 100 parts by weight of atactic polystyrene, 5–50 parts by weight of polyolefin and a required amount of a coloring agent.

2. A plastic pencil according to the claim 1 wherein said polyolefin is a polyethylene.

3. A plastic pencil according to the claim 1 wherein said polyolefin is a polypropylene.

* * * * *